(12) United States Patent  (10) Patent No.: US 8,204,084 B2
Sandstrom  (45) Date of Patent: Jun. 19, 2012

(54) INDIVIDUAL BIT TIMESLOT GRANULAR, INPUT STATUS ADAPTIVE MULTIPLEXING

(76) Inventor: Mark Henrik Sandstrom, Jersey City, NJ (US)

( * ) Notice: Subject to any disclaimer, the term of this patent is extended or adjusted under 35 U.S.C. 154(b) by 381 days.

(21) Appl. No.: 12/713,143

(22) Filed: Feb. 25, 2010

(65) Prior Publication Data

US 2011/0206061 A1  Aug. 25, 2011

(51) Int. Cl.
*H04J 3/06* (2006.01)
(52) U.S. Cl. ...................................... 370/512
(58) Field of Classification Search .................. 370/458, 370/512, 535
See application file for complete search history.

(56) References Cited

U.S. PATENT DOCUMENTS

| | | | | |
|---|---|---|---|---|
| 5,721,809 | A | * | 2/1998 | Park .......................... 340/146.2 |
| 6,002,685 | A | | 12/1999 | Wille |
| 6,771,655 | B1 | * | 8/2004 | O'Loughlin et al. ......... 370/449 |
| 7,415,033 | B2 | * | 8/2008 | Lampin et al. ................. 370/459 |
| 7,757,133 | B1 | * | 7/2010 | Parulkar ........................ 714/718 |
| 2003/0039251 | A1 | * | 2/2003 | Hara et al. .................. 370/395.1 |
| 2003/0152114 | A1 | | 8/2003 | Sandstrom |

* cited by examiner

*Primary Examiner* — Ricky Ngo
*Assistant Examiner* — Phuongchau B Nguyen

(57) ABSTRACT

Systems and methods enable adaptive, single bit-timeslot granular digital multiplexing capable of automatically and dynamically selecting an appropriate input bit from a set of alternative input ports, based on a current status of the alternative inputs. The invention enables input-status-adaptive, dynamic multiplexing of individual bits from multiple, e.g. byte-wide, input ports onto, e.g. a byte-wide, multiplexer output. An input status adaptive, dynamic, bit-granular M-by-M digital cross-connect can be formed out of an arrangement of M (an integer) instances of the input-controllable adaptive M:1 multiplexers. An application is a synchronous, digital network channel that can be dynamically shared, even at a single bit time-slot granularity, among multiple path sources, which furthermore can be located even at different network nodes. Such multi-source-bus configurations of adaptive-multiplexed network channels enable allocating network resources dynamically based on real-time data packet demand variations, thereby maximizing the network throughput for bursty data traffic.

25 Claims, 6 Drawing Sheets

INDIVIDUAL BIT TIMESLOT GRANULAR, INPUT STATUS ADAPTIVE MULTIPLEXING

CROSS REFERENCE TO RELATED APPLICATIONS

This application is related to the following, each of which is incorporated by reference in its entirety:
[1] U.S. Utility application Ser. No. 10/170,260, filed Jun. 13, 2002;
[2] U.S. Utility application Ser. No. 11/692,925, filed Mar. 29, 2007; and
[3] U.S. Utility application Ser. No. 12/363,667, filed Jan. 30, 2009.

BACKGROUND

1. Technical Field

This invention pertains to the field of digital communications and computing systems, particularly to the field of self-configuring digital multiplexers and cross-connects.

2. Descriptions of the Related Art

Traditional digital multiplexer hardware logic relies on external, conventionally software based, systems and processes to configure which of the multiplexer input data elements to select for the multiplexer output on any given multiplexing timeslot (TS, i.e. multiplexing hardware clock cycle). The conventional, non-hardware automated multiplexing control processes however are not able to respond to needs to change the multiplexing input-to-output TS mapping configuration at the hardware signal clock rate.

Thus, the traditional multiplexers, when multiplexing input signals, for example from input ports #0, 1, 2 and 3, to a time-division-multiplexed output carrier signal carrying a repeating sequence of channel-TSs, for example TSs #0, 1, 2, ... 11 repeated over and over (with an instance of the full range of output TSs, e.g. #0-11 in this example, referred to as a column), will select the same input # for any given output TS # column after column—unless and until the multiplexing input port to output TS mapping is reconfigured. As a specific example, assuming that the conventional multiplexer is configured (through its external control) to select the input #1 to its output TS #5, it will connect the signal from its input #1 on each of the TS #5 clock cycles in the repeating output carrier frame columns (comprising the channel TSs #{0, 1, 2, ... 11}, {0, 1, 2, ... 11}, {0, 1, 2, ... 11} ...).

Changing the multiplexing mapping configuration using traditional techniques, which customarily involve multi-stage software processes (executing at a microprocessor and not at the multiplexing hardware) that are asynchronous to the multiplexing hardware clock rate, and which thus consume an imprecise but large number of multiplexing clock cycles, is not possible for each new multiplexing output TS. However, being able to change the input # that is connected for any given output channel TS # (e.g. changing the input port selection from input #1 to #3 for the considered output TS #5)—and being able to do similarly for each of the consecutive multiplexer output channel TSs #0-11, i.e., continuously at every consecutive multiplexing hardware clock cycle is necessary to achieve per-output-channel dynamic multiplexing, which would be needed for instance in order to maximize the multiplexed output carrier signal utilization efficiency in cases such as where data loads from the various input ports are time-variable, calling for adaptive multiplexing configuration.

Moreover, conventional multiplexing is limited to selecting data from a single input port for any given multiplexer output channel TS; e.g. in case of a byte-oriented input and output signals i.e. byte-wide multiplexing, traditional multiplexer will select the entire byte of data from a single input port for any given output byte TS #. Prior art multiplexers thus are not able to select bits of data from multiple source input ports to the same output byte TS. Traditional multiplexers thus have to keep their entire output (byte) TSs dedicated to a single input signal. However, for effective single multiplexing-TS accurate dynamic multiplexing control, it would be necessary (though not known to be possible based on prior art techniques) to be able select e.g. multiplexing signal control bits from different input ports to the same output byte TSs, and to do so dynamically based on the same clock cycle status of the input bits.

These factors create a need for innovation enabling individual bit timeslot granular, input status adaptive multiplexing hardware with single clock cycle dynamic operation.

SUMMARY

The invention enables input-status adaptive multiplexing systems and methods, capable of dynamically changing the multiplexing input port to output TS mapping configuration based on input status changes, at individual bit TS granularity.

An embodiment of the invention provides an input status adaptive multiplexing system for connecting input data bits onto multiplexed output TS-channels. Such adaptive multiplexing system comprises i) a set of multiplexing data inputs and ii) a data output providing multiple bit positions for each TS, iii) a selector configured to identify, for any given TS, an input bit from one of the data inputs to be selected for each data output bit position, iv) multiplexing logic configured to connect, during any given TS, to each output bit position the input bit that is identified by the selector for the given output bit position on the TS, and v) a bus mapper producing a local, non-default multiplexing input and forming the selector for any given TS based at least in part on overhead bit fields on a default multiplexing input up to that TS. In an embodiment, the selector is formed based on a status of the non-default input during the present TS, with such status produced by processing overhead information on an advanced-timing version of the default input.

An embodiment of the invention provides an input status adaptive multiplexing method for selecting data onto TS-channels on a data output. Such adaptive multiplexing method comprises a set of sub-processes, altogether performed on any given multiplexing TS, including: i) receiving a set of multiplexing data inputs that carry multiple input bits on any given TS, ii) forming a selector, to identify an input bit from one of the data inputs to be selected for each one of a set of data output bit positions, and iii) during any given TS, connecting to each output bit position the input bit that is identified by the selector for that output bit position on that TS. In an embodiment, forming the selector is based on a status of a local, non-default multiplexing input during the current TS, with said status produced by a local bus mapper preparing the non-default input at least in part through processing overhead information on an advanced-timing version of the default input up to the present multiplexing TS.

Adaptive multiplexing according to the invention, being able to select bits from multiple input ports for the same output byte TS, enables highly efficient control scheme for dynamically channelized carrier networks, where the consecutive adaptive multiplexing stages are able to (over)write their appropriate bits within the multiplexing control bytes on shared network channels, while preserving existing values of the remaining bit fields.

The invention also enables highly scalable, functionally distributed cross-connect systems able to automatically perform any number of simultaneous input port to output port and bit-TS channel connection configuration changes based on the status of the cross-connect inputs, with each such re-configuration completed within a single cross-connect clock cycle.

DETAILED DESCRIPTION

Figure 1:
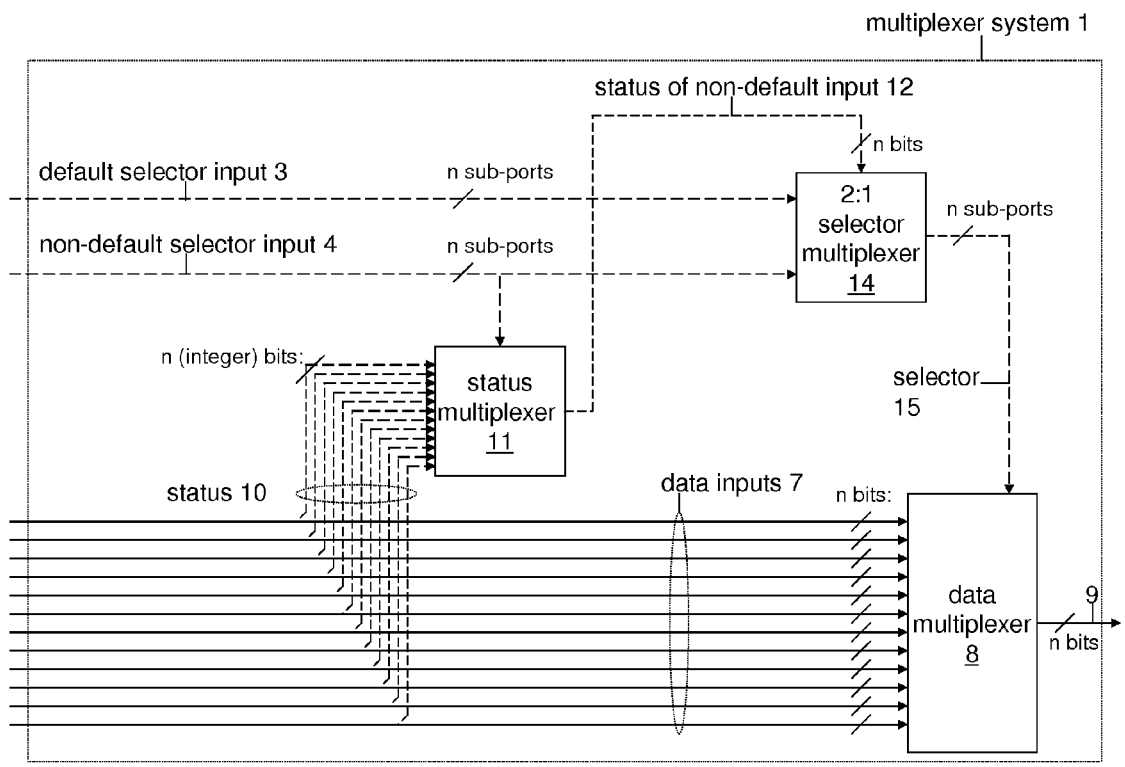
FIG. 1 illustrates of a logic block diagram for an embodiment of the invented bit granular adaptive multiplexing system.

The invention is described herein in further detail by illustrating the novel concepts in reference to the drawings.

General symbols and notations used in the drawings:

Boxes indicate a functional logic module, such as a multiplexer.

Solid arrows indicate a data, such as payload traffic, signal flow. Gapped arrows indicate control signal flow. A signal flow may comprise one or more parallel bit wires. An angled bar across a flow with text label "n bits" indicates that the signal comprises multiple (n, a positive integer) number of parallel bit positions (or generally, parallel digital information elements), from positions [n−1] linearly down to [0], with the bit index [m] ($0 \leq m < n$) of any inputs and outputs to a logic module generally corresponding to each others in terms of the logic function performed; such logic modules operating on parallel inputs and outputs, unless otherwise indicated, are to be understood to generally perform their primary logic function in parallel for their n-instances of input/output signal bit [m] ($0 \leq m < n$) pairs or sets.

Figure 2:
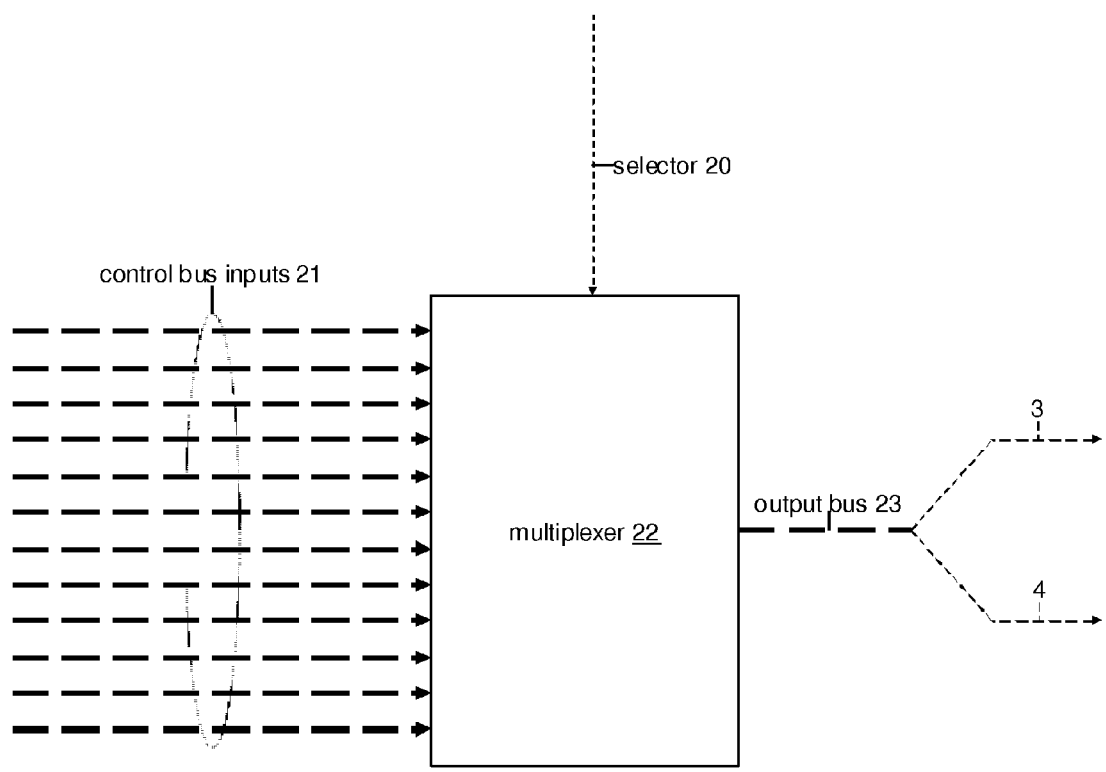
FIG. 2 illustrates a block diagram for an embodiment of additional logic enabling to time-slice the multiplexer logic of FIG. 1, e.g. for a purpose of having the multiplexer efficiently serve time-division-multiplexed (TDM) signals.

A dotted line marks a border of a group of drawn elements that form a logical entity, such as the modules constituting the multiplexer system 1 in FIG. 1, and the set 21 of input control signal buses in FIG. 2.

Lines or arrows crossing in the drawings are decoupled unless otherwise marked. Arrows ending into or beginning from a bus represent joining or disjoining of a sub-flow of data or control signals into or from the bus, respectively. Bus type of signals, i.e. signals that comprise multiple parallel logical signals, are marked with bolded lines or arrows where such differentiation of signal types is helpful.

FIG. 1 illustrates a conceptual logic block diagram for an input status adaptive, bit-granular multiplexing system according to an embodiment the invention. Basic operation of multiplexer system 1, on any given multiplexing TS, is as follows: from its set 7 of multiplexing data inputs, the data multiplexer 8 connects bits from its input port(s) identified by the values of the selector bits 15 to their corresponding data output 9 bit positions; the value for selector 15 for any given TS is formed at least in part based on the status 10 of the inputs 7 on the current TS. The multiplexer 8 is thus said to select, in an input status adaptive manner, for each of its (n, a positive integer number of) output bit positions, the data input bit identified by its selector input 15 bit(s) associated with a given output bit position, and that process of selection, in an input bit status adaptive manner, by the multiplexer system 1 an input bit from one of its input ports 7 to the output 9 bit position corresponding to the given selector bit(s) is referred to as a bit granular, adaptive multiplexing process, which in embodiments of the invention is completed on a single multiplexing clock cycle i.e. TS.

In FIG. 1, an example case of two alternative multiplexing inputs per any given output TS is presented. These two alternative inputs are identified for each new TS out of the set of multiplexing inputs 7 by the values of their associated configurable selector inputs 3 and 4. The status information flows 10, presented in FIG. 1 as gapped arrows departing from the data inputs 7, in an embodiment comprise digital wires carrying the associated control bits to be selected by the status multiplexer 11 onto the control signal 12, which defines which of the alternative selectors 3, 4 the selector multiplexer 14 chooses as the selector 15 that controls the data multiplex 8. The selector 15 (as is the case with alternative selectors 3, 4) is a logical digital signal bus comprising output port bit position specific selector bits, which present, in a digital form, a value that identifies a bit from a data input port (e.g. from input port #5, of ports #0 ... 7) of the multiplexer 8 matching the selector value for the given output bit position. In embodiments, the selector 15 bus can include bits in addition to those derived from one of the alternative selectors 3 or 4, e.g. bits common to the selector value being formed at a given TS. Moreover, various embodiments can have different numbers of alternative selectors and inputs.

In a simple exemplary scenario for multiplexing data bytes with a multiplexing system per FIG. 1, the n (any positive integer number) sub-ports (bits or bitfields) of the various signals labeled as comprising "n bits", and logic that operates on and connects each bit position [m] ($0 \leq m < n$) at these signals, are n parallel installations of the elementary, single-bit-wide adaptive multiplexer functionality. As such, the basic adaptive multiplexing per FIG. 1 can be explained and understood by considering the case of n=1 first; multi-bit-wide adaptive multiplexers according to embodiments of the invention can be realized through linear (parallel) extensions of the elementary multiplexer for the case of n=1.

Unlike with prior art multi-bit-wide, e.g., byte-wide multiplexing, by utilizing the invention the n-parallel bit position specific elementary multiplexers are able to function independently from each others, each based on their respective (non-default) input status 12 bits [m], for any output 9 bit position [m] ($0 \leq m < n$). Thus, the invented individual bit granular, input status adaptive multiplexing systems and methods enable selecting bits from multiple input ports 7 on the same, e.g. byte, TS, for the different (n) bit positions on the output port 9. In a simple example case, there are equally many (e.g. n=8) parallel input bit positions per each of the data input ports 7 as there are output bit positions on the data output 9. In such a case, the selector bus 15 provides same number (e.g. 8) of output bit position specific selectors, which naturally are to have enough bit-width each to be able to identify the selected input port within the applicable range of input ports (e.g. width of four bits to select from up to sixteen input ports). In these type of linearly parallel cases, each input and output bit [m] and selector bus element [m] ($0 \leqq m < n$) are said to correspond to each others, and accordingly for any output bit [m], e.g. output bit position [3], it is sufficient for the selector specific to the output bit [3] to identify merely the input port 7 number, and the bit [3] from such identified input port is connected to the output 9 bit position [3] on that multiplexing TS, and similarly for each bit index [0], [1], [2] and so on up to the maximum but index [n−1] on the output port.

In alternative embodiments, the inputs 7 may have different number of bits per port among themselves as well as compared to the output 9, with the output bit position specific selectors able to select bits from even the entire range of input bits across all the input ports and all their respective bit positions. Since such more complex multiplexer configurations are possible by combining the herein described, bit-TS-granular adaptive multiplexing method with known logic design and implementation techniques, for clarity of illustration of the novel concepts, the remainder of the specification focuses on the elementary innovative techniques, using the most simple logic configuration possible, specifically, a case of elementary adaptive multiplexing for any given individual data output bit position that furthermore has the lowest practical number i.e. two alternative input ports, as illustrated in FIG. 3.

FIG. 2 illustrates a block diagram for additional logic enabling to time-share embodiments of the multiplexer system 1 of FIG. 1, e.g. in applications for the multiplexer system to efficiently support time-division-multiplexed (TDM) data signals, such as Synchronous Digital Hierarchy (SDH) and Synchronous Optical Network (SONET) based signals. The example logic of FIG. 2 comprises a 12:1 multiplexer 22, which selects, out of the set 21 of twelve control bus inputs, the input control bus identified by its selector input 20, to its output bus port 23. The selector input 20 is used to identify a TS channel order number (within a revolving sequence of the TDM channels being multiplexed), which for the example logic of FIG. 2 is an integer between 0 and 11 (inclusive, assuming the TSs are numbered continuously starting from 0), on a TDM based output signal 9 of the multiplexer system 1. If the output signal 9 was an STS-12 SONET signal, the selector input 20 would identify the STS-1 TS number on that STS-12 output for which the selectors 3 and 4 produced by the logic of FIG. 2 apply. With the selectors 3 and 4 for FIG. 1 produced by the logic of FIG. 2, such an example embodiment of a multiplexer system 1 of FIG. 1 can be used as an efficient, input-controllable dynamic, bit-granular STS-12 output multiplexer of an STS-1-level XC system. Naturally, replacing the multiplexer 22 of FIG. 2 with e.g. a 48:1 (or 192:1) multiplexer enables to use the multiplexer system of FIG. 1 as an efficient STS-48 (STS-192) output multiplexer of an STS-1-level XC, and so forth.

Figure 3:
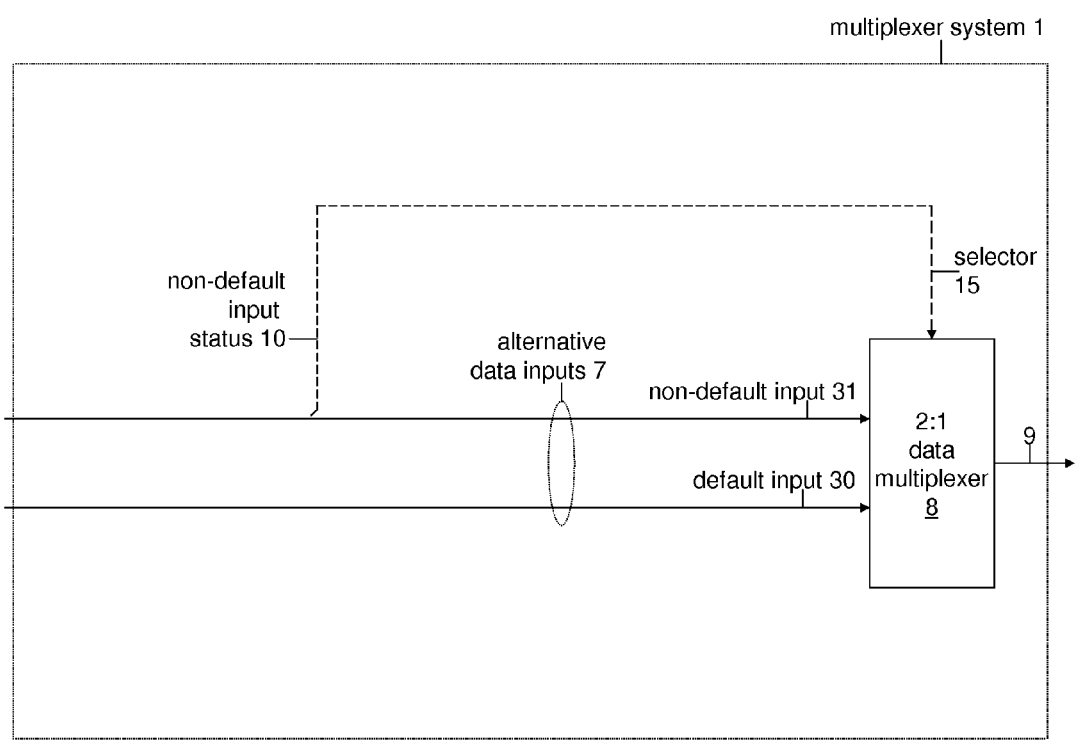
FIG. 3 provides a functional logic diagram for a reduced embodiment of the multiplexer system of FIG. 1.

In the simplified embodiment of multiplexing system 1 illustrated in FIG. 3, it is assumed that the status on just one of the pair of alternative data inputs 7 for a given multiplexing TS is sufficient to determine which of these two alternative inputs to select on each new multiplexing clock cycle, thus allowing the elimination of (w.r.t. FIG. 1) the external selector inputs (3 and 4) and the related wiring (non-default input status 12) and logic (status and selector multiplexers 11, 14), as in FIG. 3 the status 10 from the known non-default input 31 is directly usable as the selector bit 15 for the 2:1 data multiplexer embodiment 8. Note further that the TDM control logic overhead per FIG. 2, which in embodiments are used to time-share the multiplexer 1 per FIG. 1 among a number TDM channels on the bus 9, is not needed for the simplified multiplexer system per FIG. 3 even when the multiplexer 1 of FIG. 3 was multiplexing TDM based input 7 and output 9 signals, since in the case of FIG. 3 there is no need for the (externally provided) alternative selectors (or the logic to produce them); for the multiplexing per FIG. 3, the selector 15 is derived directly from status 10 of one of the inputs 7 for each multiplexing channel TS. Accordingly, per FIG. 3, the mere TDM channelization of the inputs, specifically the non-default input 31, provides the channel specific multiplexing control 15, as the input status 10 (connected to the selector 15) is channel-TS synchronized to the data inputs 7.

By comparing FIG. 3 to FIG. 1, and to FIG. 2 accompanying FIG. 1, it is seen that the aforementioned, in-themselves quite minor simplifications enable reducing the system logic and wiring complexity considerably, providing more clear illustration of the novel aspects of the herein described multiplexers, as well as, in applications where such reduced multiplexing logic functionality suffices, more cost-efficient and scalable digital logic implementation of the input status sensitive, bit TS accurate adaptive multiplexing.

Since the full logic process operation of the multiplexer systems 1 is, in the herein illustrated embodiments, completed within a single multiplexing hardware clock cycle, utilizing the elementary invention illustrated in FIG. 3, embodiments of multiplexing systems 1 are able to select, at a single input and output data signal bit TS granularity and for each consecutive multiplexing byte (or word etc.) TS, the correct one of out of a set of pre-configured alternative input bits, based on the input signal status info 10 carried in conjunction with its data inputs 7 on the present multiplexing clock cycle. Due to the same clock cycle i.e. single TS completion of the input status adaptive multiplexing process, which moreover is done in parallel, and in the herein considered embodiments, generally independently, for each of the output 9 bit positions, multiplexers 1 are able to dynamically select the appropriate input bit for each output bit positions for every new multiplexing TS, as determined by the input status, clock cycle after clock cycle. It is thereby possible, when and where so needed based on the input status indicators, for a multiplexer 1 to select a bit from a different data input port for a given output bit TS than what was selected even for an immediately preceding TS of that output bit position for the same, or any, output channel signal. For reference, note that the term (TDM) channel as used here, for embodiments of the invention when used for applications per the references [2] and [3] refers generally to the element 8 in those application systems.

Specifically, a multiplexing system 1 per FIG. 3 will select a different input for the present bit TS than it did on the previous bit TS (of the same or any other channel) in case the status of the non-default (in embodiments referred to as the local input) alternative input is different on the present TS than it was on the preceding TS (for the same, or any, channel). Note also that each of the sequentially repeating TDM channels being multiplexed onto the multiplexer output can further still use TDM framing within them, i.e., while the primary TDM channels bytes, in case of byte-wide multiplexing, are mapped to the repeating series of TSs on the multiplexer output 9 carrier signal, any such individual TDM channel can also have its own repeating framing based on time-division-multiplexed TSs. In any such cases, the multiplexers 1, being able to do bit TS dynamic, input status adaptive multiplexing are able to select, when so demanded by input status, a bit from a different data input for each new output bit TS, even for consecutive TSs of any given multiplexed channels, as well as to do so for each of the consecutively multiplexed channels on the successive multiplexing TSs.

An example application of where the novel capability to multiplex individual bits from different input byte (or word) ports into same output byte (or word etc.) TSs is needed, is a case of providing multi-node-distributed, dynamic control for adaptive (e.g. SONET STS-1 or SDH VC-3) TS concatenation multiplexers in a cascading network configuration, by having the individual source nodes to (over)write their appropriate, dynamically determined bitfields in the adaptive-concatenated (STS-N) network bus overhead byte TSs (e.g. the STS-1 Path Overhead bit fields), per applications system specifications in references [2] and [3]. Please in particular see the reference [3] for an example application where adaptive multiplexing (for the source nodes of the network buses to map data on a network bus on their dynamically assigned TDM, e.g. SDH VC-3, channel resources) is useful, as is the capability for source nodes, through producing the local i.e. non-default inputs (whereas the upstream bus is the default input) per any given stage of adaptive multiplexing, to be able to (over)write the appropriate bits in the bus access control bytes, to effect the single bus capacity allocation cycle dynamic and individual bit TS accurate capability for the bus to react to data load variation changes among the individual source nodes toward the destination of the bus, in order to keep such network bus data throughput continuously maximized under any traffic load variations. Reference [1] moreover provides a specification for earlier embodiments of input-status-sensitive multiplexing, including descriptions of various types of (generally byte-wide) multiplexing system configurations and application modes (e.g. multi-source-bus) that are generally are applicable also for the individual bit TS accurate, input bit status adaptive multiplexing disclosed herein. Furthermore, network control plane signaling schemes for applications per the references [2] and [3] can utilize the herein disclosed single-bit-TS dynamic multiplexing, including for the purpose of managing the access to the bus 9 bit TSs so that each bus bit TS will be used for carrying (overhead or payload) data from the appropriate one of the bus source nodes at any given bus capacity allocation cycle and section on such buses, without race conditions (i.e., without cases where multiple nodes along a network bus would seek to have their transmitted data to be carried on the same bit TSs on the same inter-node sections along the bus).

In its reduced form presented in FIG. 3, the operation of the logic function of a multiplexer system 1 according to such simplified embodiment of the invention, assuming that positive logic is used, and that the non-default data input 31 is connected to the input port #1 and default data input 30 to the port #0 of the 2:1 data multiplexer 8, is as follows:

on multiplexing TSs when the status indicator 10 (in an embodiment, an active-status indicator, which becomes directly the selector bit 15) of the local, non-default input 31 is at its active state (at logic '1'), the non-default input bit 31 gets connected to the data output bit 9, and otherwise, the default input bit 30 gets connected to the output bit 9.

In the embodiments studied herein, such adaptive multiplexing operation executes once for each hardware clock cycle, i.e. once each multiplexing system TS; this is at hardware logic level due to that multiplexer 8 logic function is triggered by a change in the status of its data inputs 7 and the selector input 15 that is derived (in an embodiment directly, as illustrated in FIG. 3) from the input status 10, a potential change in which accompanies new data entries being loaded on the data inputs 7. In such synchronous logic embodiments, the inputs 7 get new data entries at the multiplexing system hardware clock cycle edges (e.g. following the clock rising edges), thus resulting in that the adaptive multiplexing process as described above in relation to FIGS. 1 and 3 is executed following the active clock edges (e.g. rising edges), and is completed, with the appropriate newly loaded input data bit(s) connected to the output bit position(s) before the next active (e.g. rising) system clock edge. (The multiplexer output signal 9 then can be latched at e.g. flip-flop registers clocked with the same clock signal edge, to break the combinatorial logic chain, and to provide clock-edge launched multiplexing output for downstream processing or transmission). That input bit status adaptive multiplexing process repeats for the successive clock cycles, without a need for any overhead or such downtime, allowing the bit-granular adaptive multiplexer systems per embodiments of the invention to perform such input status controlled dynamic multiplexing uninterruptedly for any number of consecutive multiplexing and multiplexed channel signal TSs, with the appropriate input bits selected to each bit position on the multiplexed output (byte) TSs for each new (byte) TS, according to the input status for each TS.

Figure 4:
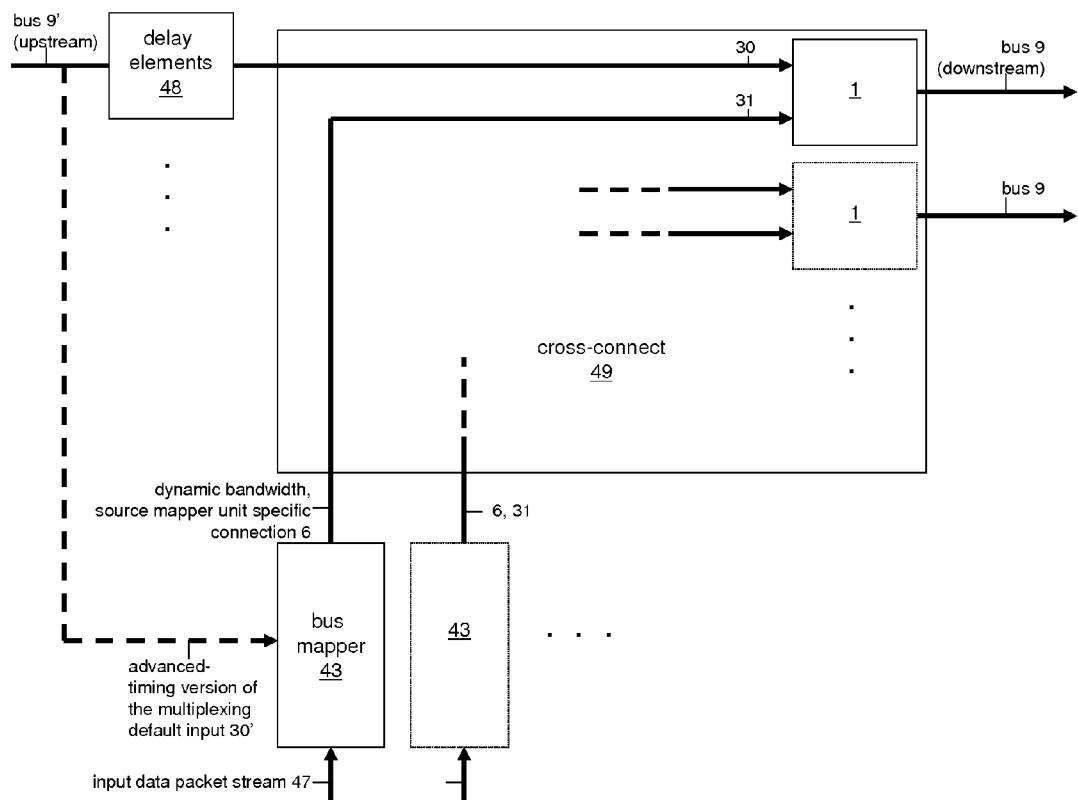
FIG. 4 provides a system block diagram for an embodiment of an cross-connect (XC) involving adaptive multiplexing subsystems of FIG. 3, involving a capability to supply input data stream based control signaling in advanced phase w.r.t to the default multiplexer data input signal phase.

FIG. 4 illustrates a block diagram for an embodiment of a cross-connect system 49 involving adaptive multiplexers 1 per FIG. 3. In an embodiment of the multiplexing subsystem 1 of FIG. 4, for a given multiplexing TS, the status bits 10 of the local, non-default data input 31 (which directly form the selector bits 15 per FIG. 3) are produced by processing overhead information on an advanced-timing copy 30' of the default data input 30. Note that in the logic circuit implementation of a system per FIG. 4, the bus 9 and its various processing phases are digital logic signals. Since the synchronous delay elements 48, e.g. flip-flop registers, cause the default input 30 at the XC multiplexing 1 input port stage to be some desired number (e.g. two) of multiplexing clock cycles behind the advanced version 30' of that upstream bus signal, the logic at the bus mapper 43 has that many (two) clock cycles of time to monitor and process the (overhead) information on the associated default input signal 30, to determine on which upcoming bit TSs that mapper is to transmit its overhead or payload data on its locally sourced connection 6 (that drives to the multiplexing non-default input 31, which is then at the same signal frame phase as the upstream bus carrying default input 30), and set the associated status bits 10 (which in an embodiment connect directly to multiplexer selector input 15, per FIG. 3) to their active values causing the two-data-input multiplexer 1 to select the non-default input bits to their corresponding output 9 bit positions on those multiplexing TSs.

Note that in certain embodiments, the advanced version 9', 30' of the network bus to the bus mapper 43 of given multiplexing stage along the bus 9 does not need to be digitally identical (i.e. simply advanced in phase, but without other difference) compared to the actual bus multiplexing default input 30. Generally, the bus channel access control information, frame phasing and any alarm indication information is to be identical between 30' and 30; however, in certain embodiments, other type of processing can be done for the signal 30 while on the sequential logic pipeline 48. In such embodiments, the delay elements 48 thus do not actually increase system latency for the bus 9, and do not increase the register requirements for the system circuit implementation. In such a logic design embodiment, the advanced version 30' of the bus (carrying the sufficient control information for mappers 43, even if not all the information for all the downstream processing on the bus 30, 9) thus is effectively a preliminary version of 30 diverted for processing at a mapper 43 in parallel to being processed and/or shifter forward in the sequential logic 48.

In embodiments of systems per FIG. 4 utilizing the adaptive multiplexers 1 for dynamic network channel access allocation applications, a version of the default input 9', 30' that is advanced by a sufficient amount of the multiplexing system clock cycles w.r.t to the default input 30 of the multiplexer 1 is connected to bus mapper 43 (which in an embodiment maps on the connection 6 data packets arrived to the local network node via its access input 47), for the mapper 43 to use the information carried on the upstream bus 9' i.e. default input signal (e.g. in its overhead bit fields) in determining on which upcoming bit TSs on the non-default input 31 (which the mapper 43 sources) to transmit its data, and accordingly, for which such bit TSs to indicate their status (via auxiliary output bits 10) as active, signaling that the multiplexer 1 (per FIG. 3) on such TSs is to connect the bit from the non-default input 31 to its corresponding bit position on the downstream bus signal 9.

In an embodiment, the data and buses control buses 9', 30', 30, 6, 31, 15, 10 and 9 are assumed to be of equal bit width, e.g. that they all carry for instance eight bits (i.e. a byte) of data on any given TS, and the status 10 bit [m] applies for the non-default input data 31 bit [m], the selector bit [m], and for the multiplexer output 9 bit position [m], for any integer m between 0 and 7 inclusive, assuming eight-bit-wide bytes are being multiplexing. In other embodiments, said digital bus signals (9' etc.) can be of different widths, e.g. 32, 128 etc. bits, as well as they can have auxiliary (timing, status, control etc. overhead) bits processed in parallel with their associated bus data bit positions, with analogue operation to the 1-bit (or byte) wide adaptive multiplexing described herein in detail, when incorporating or applying the herein disclosed inventions.

As an application example, the reference [3] describes an operating context where an embodiment of a bus mapper 43, if deployed in such an application scenario, is to monitor and process overhead bits on advanced-timing version of the default (i.e. upstream bus 9') input, and accordingly determine on which of the consecutive multiplexing (byte) TSs to activate its transmission on the downstream bus 9 bit TSs and on which of the local dynamic bandwidth connection 6 bit positions to map its local overhead or payload data (as shown in FIG. 4, the connection 6 from the bus mapper 43 becomes the non-default input the for the multiplexing subsystem 1). In particular, for wide-area-network bus applications of the invention such as the dynamically channelized network bus applications discussed in the reference [3], the upstream bus overhead bit fields are monitored by mappers 43 along the network bus, as well selectively overwritten by such mappers 43 utilizing the herein disclosed inventions, in a process to control and indicate which of the bus source nodes use which of the bus 9 TSs for their connections 6 to the destination of the bus. (For reference regarding network channel allocation signaling applications of the invention, note that element 6 in systems per FIG. 4, when used in applications per reference [3], refers generally to the same concept of network physical layer connection as the element 6 in the specification of the reference [3].)

For individual bit accurate access to the bus 9 byte TSs, which is of use e.g. in allowing the mappers 43 to (over)write their appropriate bits on the bus overhead byte TSs, the adaptive multiplexers 1 according to embodiments of the invention provide individual bit TS granular access to the bus 9 output bytes, enabling to select bits from different inputs on the output bit positions of the same given byte TS on the downstream bus 9. For instance, a given multiplexer 1 instance (per FIG. 3) along a bus 9 could, on a given bus overhead byte-TS and according to the non-default input bus 31 status bits 10 from the local mapper 43, select the bits [6] and [3:2] from the non-default input, and the bits [7], [5:4] and [1:0] from the default input. In a specific application case, such as in a bus control byte signaling per reference [3] the local mapper can write the bits [6], overwrite bits [3:2] on the outgoing overhead byte on the downstream bus 9, while letting the bits [7], [5:4] and [1:0] pass-through connected from the upstream default input 30 onto the downstream bus 9 at that multiplexing stage. On the following multiplexing TS, in a given scenario, the multiplexer 1, again according the value of status 10 bits on that TS, the bit [6] for the output (overhead) byte TS could be selected from the non-default input, while the bits [7] and [5:0] for the same output byte get selected from the default input.

This novel capability to pick bits from more than a single input port for a given multiplexer output byte TS is significant (among others) for the reason that it allows efficiently forming network multiplexing and demultiplexing control bytes for applications where the execution of the algorithms used for network resource such as bus channel allocation, assignment and reassignment is distributed among multiple network nodes (e.g. for applications based on the reference [3]). Specifically, the ability for the multiplexers 1 to selectively (over)write individual overhead bits (e.g. for applications per reference [3] as discussed above) allows effective re-use of the bus access control bit fields along the inter-node segments on the bus, thus enabling single byte-TS processing of given channel control information at given multiplexing or demultiplexing stage and immediate execution of the dynamic bus control signaling, while avoiding the to need use multiple (multiplexing stage specific) copies of the control information (and consequently, in TDM channel such as VC-3 based applications per reference [3], allowing to use the full VC-3 payload i.e. C-3 fields for client data, with bus 9 control signaling carried in the VC-3 POH byte columns).

This invention thereby enables the multiplexing input processing logic (in module 43, producing the status (selector) bits 10 (15) for multiplexer 1 per FIG. 3) to operate at the same signal frame TS phase as the default (upstream bus) input 30 and the multiplexer direct output 9 (before the signal 9 is registered), i.e., to have an immediate (effectively processing time free) reacting capability to the bus access control information flowing on the default input 30. Note that, by the time (i.e. by a given multiplexing TS) that overhead bits from upstream bus input 30 (i.e. the multiplexing default input) would (by default) get connected to output 9, per the invention, the logic at the mapper 43 already is able to overwrite the appropriate overhead bits (on that same given multiplexing TS) through the multiplexer 1 onto the downstream bus 9, by activating the appropriate status bits 10 for its local bus entry 6 i.e. the non-default bus input 31 and loading the relevant bits on its connection 6. Hence, the mappers 43, and through their outputs 15, the multiplexers 1, at various adaptive multiplexing stages along network buses 9 are able to operate as if they were, at least in part, controlled by the multiplexing control signaling bits on the default inputs 30, even the overhead bits on the same current multiplexing TSs; as shown via FIGS. 5 and 6, in certain applications the bus overhead field 51 info on upstream bus flows 30' and 30 will control and/or indicate, at least in part, on which of the bus bit and byte timeslots the local mapper 43 of any given multiplexing stage 1 maps its data on its connection 6, 31 and onto the downstream bus 9. The same way as the mappers 43 operate in same-TS-synchrony with the bus 9 access control overhead, including by preparing the non-default input 31 status 10 bits accordingly, the multiplexers 1 process and adapt to new selection control 15, provided in an embodiment via the non-default input status 10 bits, within a single signal byte TS response. Techniques per FIGS. 1-4 thus enable the adaptive multiplexing to provide same-clock-cycle response to any changes to multiplexing configurations called for by the upstream bus 9', 30 overhead signaling (and the local demands as determined by the logic at mappers 43), and to do so at individual bit TS granularity, for each new clock cycle consecutively.

As well, there can be any number of inputs and outputs to an XC per FIG. 4, with at least some of the outputs being served by multiplexers 1 (per FIGS. 1 and/or 3.), and where applicable, receiving their non-default inputs and associated status from mappers 43. Since the multiplexers 1, and where applicable, their associated mappers 43 are dynamically self-controlled, i.e., able to automatically adapt their multiplexing input-port-to-output-bit-TS mappings as appropriate based on the control from the upstream bus (or elsewhere, e.g. from a bus access controller module where applicable, as elaborated in the reference [3] for bus control signaling applications) and local demands, the adaptive multiplexing techniques per FIGS. 1-4 allow configuring highly scalable, reliable and high-throughput digital cross-connect systems that operate dynamically as is intended without a need for complicated, e.g. software based control and management systems and processes that would not be able to operate synchronously and dynamically at the data signal (9', 6) bit TS accuracy.

Moreover, in such adaptive-multiplexed network bus 9 applications per reference [3], during the bus payload data fields (52, see FIG. 5) between the overhead bytes (51, in FIG. 5) controlling the bus channel access among the source nodes of the bus 9, adaptive multiplexing stages 1 at the source nodes along the bus 9 select their local, non-default inputs 31 on those multiplexing bit TSs that the local mappers 43 determined, based at least in part on the overhead information bit fields 51 on the default inputs 30 up to (inclusive) the current TS, to be for them to use. An example of how such input status adaptive, individual bit TS granular multiplexing, using techniques of FIGS. 1-4, can operate is illustrated in FIG. 5, using a chart that shows two example status bit 10 signal waveforms, and the multiplexing input port selections for their related data output bits (bits [4] and [3]) as well as for the other output bit positions for the assumed case of byte-wide multiplexing (i.e. where the client data, mapped on the multiplexer output 9 during the payload TSs 52, is byte oriented; e.g. per any given connection 6, organized as packets made of given number of 8-bit bytes).

Figure 5:
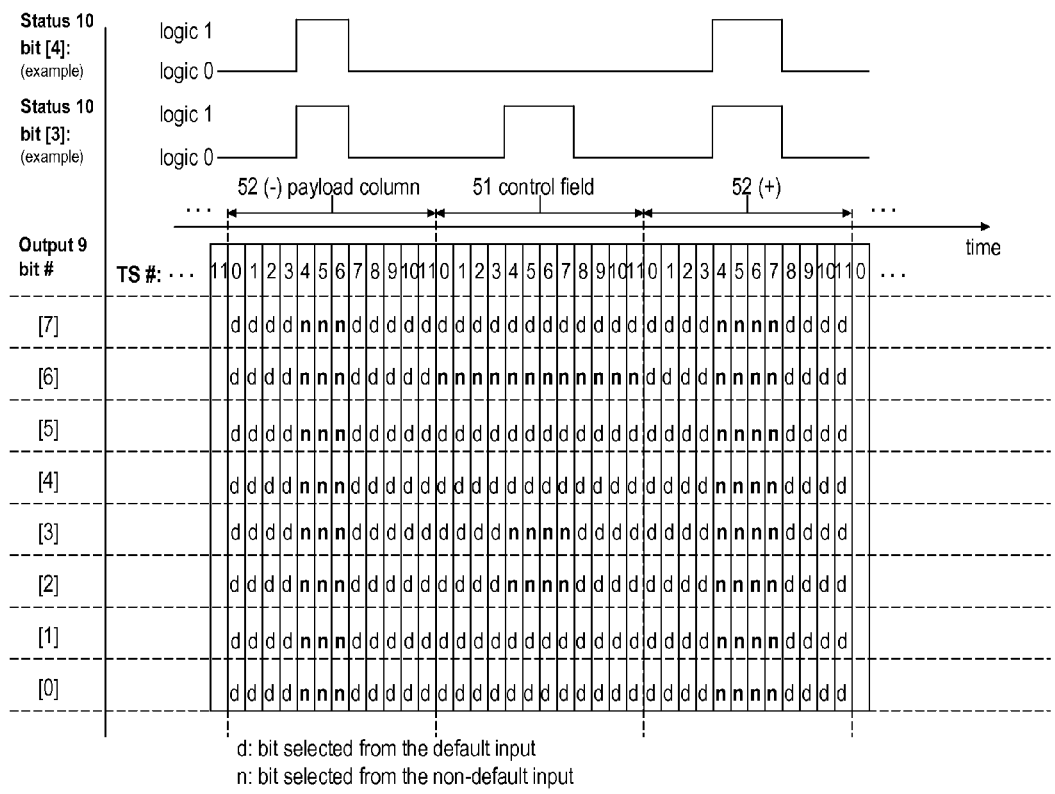
FIG. 5 illustrates a digital signal timing diagram for a individual bit granular adaptive multiplexing method in accordance with an embodiment of the invention.

The example FIG. 5, relating to an application of the invention such as a case of VC-3 channelized network bus per the reference [3], illustrates following features of the herein disclosed adaptive multiplexing:

During the first of the shown columns of twelve repeating payload TSs 52– (drawn toward the left end of the chart in FIG. 5), the local mapper 43 at the studied adaptive multiplexing stage selects the non-default 31 (i.e. local connection 6 in FIG. 4) input bits on the TSs #4-6, and the default 30 (i.e. upstream bus, 9') input bits on the other TSs #0-3 and #7-11.

On the overhead information field 51, assuming an example application of an embodiment of the invention used for bus control signaling per the reference [3], the local mapper 43 writes its capacity demand info on the bits [6] throughout the channels #0-11, as well as (over) writes the bus access control bits [3:2] for channel TSs #4-7 (by setting its local input 6, 31 status bits 10 into their active values for these bit TSs), while letting the remaining bits through without modification (by keeping the status bits 10 in their inactive values for the remaining bit positions). As seen regarding the bits [3:2], identifying the active source node for a given channel for a given bus capacity allocation cycle in case of an application per reference [3], in the example illustrated in FIG. 5 the local mapper 43 gets assigned via the overhead information on the TSs 51 on the upstream bus 9' and/or assigns to itself the TSs #4-7 on the bus 9 for the following payload field TSs 52+ (i.e. in an embodiment used in an application per reference [3], e.g. for the next C-3 row worth of series of channel TSs for which the overhead field 51 shown in FIG. 5 applies to).

During the second column of the payload TSs 52+ (toward the right end of the FIG. 5), according to the processing of the overhead field 51 received on an advanced default input 30', the local mapper 43 activates for multiplexer 1 the selection of the non-default 31 input bits on the TSs #4-7, and the default 30 input bits on the other TSs #0-3 and #8-11.

As thus illustrated in FIG. 5, during each multiplexing byte-TS, and for each output bit position, the adaptive multiplexer 1 selects for the bus 9 the non-default input 31 if its associated status bit 10 is at its active value (e.g. logic '1' in case of positive logic indication), and the default input 30 otherwise. This functionality is seen by comparing which alternative input is connected to the example output bit positions [4] on the clock cycles on which the status bit 10 for the non-default input bit [4] is at logic '1' vs. where that status bit is at logic '0'. The same can be observed by studying the selections made for the bit positions [3]; it also can be seen that bits from different input ports are selected for the output bits [4] and [3] when their respective status bits are in different logic values, even on the same multiplexing byte TS.

It is thus seen (per FIG. 5) that the techniques disclosed herein enable adaptive multiplexing whereby, for any given bit position and based on input status on the present multiplexing TS (which in embodiments is produced at least in part by processing overhead fields 51 of inputs 7 up to the present multiplexing TS), the multiplexer is able to select an appropriate input bit that can be from a different input port than:

a) another bit selected for another parallel bit position on the same multiplexing byte TS (for example, on the TS #5 of overhead field 51, for output bit [4] the default input is selected, while for the output bit [3] the non-default input is selected), as well as, b) the input port from where the bit was selected on both:
  i. the immediately preceding multiplexing TS (for example, on the first (leftmost) of the payload TS column 52–, for bit [4], the non-default input is selected on TS#4, while the default input was selected on the TS#3) and
  ii. the previous TS of the given channel, e.g. a TDM channel within a bus 9 (for example, for output bit [0], on the second (rightmost) of the payload TS column 52+ shown, post overhead field 51, on e.g. TS-channel #7, the non-default input is selected, while on the previous byte TS for the TS-channel #7, the default input was selected for that output bit position).

Which input bit thus is selected for connection to any given multiplexing output bit TS, according to the disclosed multiplexing systems and methods, depends, in embodiments such as per FIG. 3, directly, on the value of the corresponding status bit 10 of the non-default input 31, which in embodiments e.g. per FIG. 4 are produced at least in part by processing overhead fields 51 on the advanced version 30' of the multiplexing default input 30. It is further noted that in alternative embodiments, there can be a variable number of TS delays (in multiples of the number of revolving TDM channels multiplexed) from the overhead field 51 to when the processed new multiplexing control i.e. updated values for selector bits 15 are ready to be applied.

Figure 6:
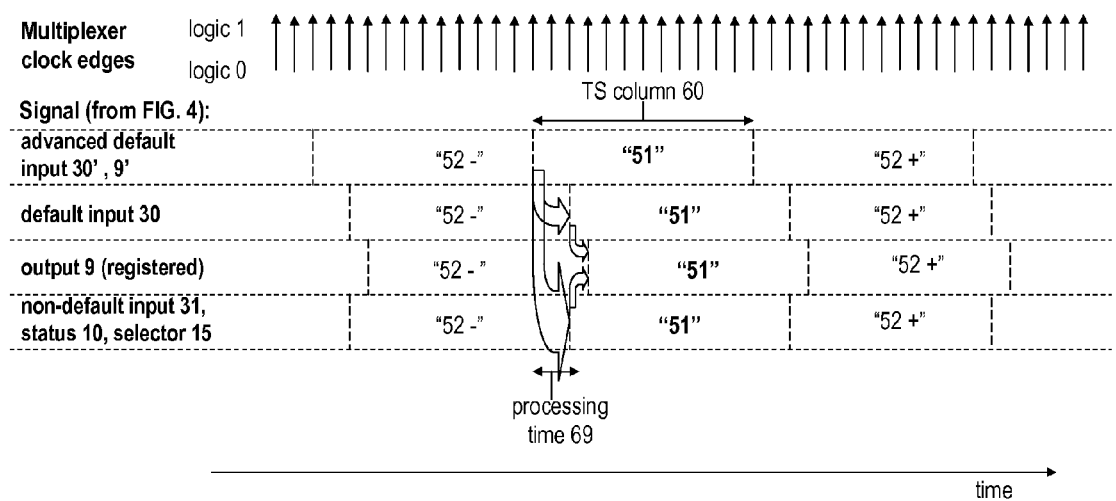
FIG. 6 shows an example digital signal flow timing diagram for an multiplexing stage in the system context of FIG. 4, and in relation to the bit granular adaptive multiplexing process illustrated in FIG. 5.

FIG. 6. illustrates an example logic signal flow timing diagram for an embodiment of the multiplexing process utilizing the invented techniques.

The curved arrows indicate which signal inputs drive the logic (or plain wires) for which next stage of the signals. The reference numbers in quotation marks inside the bus TS-column 60 boxes indicate the phase of the bus 9 signal flow at the given signal net at the given period of time, referencing to the TS-column markings (52−, 51, 52+) of FIG. 5; references to "51" indicates that the given signal net at that phase is carrying the overhead field TSs, and reference to "52−/+" that the given net is carrying the payload column TSs immediately preceding/succeeding the overhead field 51. Note that TS columns in the example shown in FIG. 6, as it relates to example of FIG. 5., comprise a series of twelve repeating multiplexed TS channels, and each of such multiplexing TSs (when any given TS-channel is multiplexed out) is started with (and ends to) a rising clock edge. The multiplexing clock signal active edges for the case of FIG. 6 are shown as arrows pointing up; in this embodiment, there are twelve multiplexing clock cycles in each TS-column 60.

Note further that as in synchronous logic embodiments the signals are clocked out of their source (flip-flop) registers on the system active (e.g. rising, per FIG. 6) clock edges, in practice a given phase of the signal 9 for successive channels (e.g. TS channels #0 . . . 11) at a given signal stage (e.g. multiplexer default input 30) begins and ends at different phases, on successive clock edges within the TS-columns starting with channel #0. Since the channels normally operate independent of each others, for simplicity of discussion we can consider the adaptive multiplexing signal timing flow for any chosen one of the TS channels, e.g. TS#0 from the case of FIG. 5; the multiplexing for the remaining channels #Q (Q=1, 2, 3 . . . ) operates with similar principle and happens at Q clock cycles after the multiplexing of channel #0 (in an interleaved manner, for any stage of processing and signal flow per FIG. 6).

As indicated in FIG. 5, in the embodiment used herein for illustration, the overhead information on a channel #Q, e.g. channel #0 TS, on the overhead field 51, as the bits on that overhead field 51 TS #0 are loaded on the multiplexer output 9, carry the control signaling for the payload field 52+ TSs #0 for the next bus capacity allocation cycle; the same is true for any of the multiplexed TDM channels, e.g. the channel on TS #7, that in the example of FIG. 5 gets assigned to the local node: before the overhead field 51, on the payload TS column 52−, the payload TS #7 bits on the multiplexing output 9 were selected from the default input 30, but after the overhead field 51, and according to the related bitfields on TS #7 of the overhead field 51, on the payload TS column 52+, the payload TS #7 bits on the multiplexing output were selected from the non-default input 31 that local node mapper 43 sources. For the case of TS-channel #0, with the same principle, according to related bit values on the overhead field 51 TS #0, the bits for following the payload 52+ TSs#0 are selected from the default-input 30 (like they were also on the payload 52− TSs #0 also before the shown overhead field 51).

Considering thus the exemplary channel #0, it is seen from FIGS. 4-6 that by providing for the mapper 43 a version of the bus 9' that is two clock cycles ahead of the multiplexer 1 default input 30 phase, the mapper 43 logic gets two clock cycles of processing time 69 to determine whether it will (based e.g. on the network bus channel allocation and re-assignment methods for applications per the reference [3]) be mapping its payload data on the TSs #0 of the payload columns 52+ on the following bus capacity allocation cycle for which the given bus overhead field 51 applied to. (E.g. in en embodiment using SDH VC-3 based bus 9 channeling, the natural bus capacity allocations cycle is a VC-3 row period, with such VC-3-Nc bus control field 51 TSs carried in the VC-3 POH overhead TS column, and the payload field 52 being equal of a C-3 row field of byte TSs). In a linear extension based embodiment, the same bus overhead field 51 TS processing and bus payload field 52 TS local data mapping and/or upstream input pass through connection operation as with TSs #0 and #7 per discussion above applies for any given channel (e.g. VC-3 #0,1,2, . . . 11 of VC-3-12c) on the bus 9.

Thus for a given bus TS channel #, the local mapper 43, by receiving a sufficiently advanced-timed copy of the upstream bus signal that carries (preliminary) bus channel assignment information on its overhead fields 51 (or otherwise receiving such overhead bits sufficiently in advance, e.g. from a local-node bus access control module in end-of-bus applications per reference [3] i.e. generally in situations where there are no upstream nodes or equals), the mapper 43 logic can react, in time to impact the outgoing overhead bit fields 51 on the downstream bus 9, to the bus overhead information that would only appear on the multiplexed (and registered) output signal 9 one clock cycle after the local, non-default input 31 and its status bits 10 (that, per FIG. 3, by becoming the selector input 15 for the data multiplexer 8 control its input selection) are to be produced for the multiplexer 1 input, to achieve proper bit multiplexing for the outgoing overhead field 51 TSs as well as the associated payload field 52 TSs for which the given overhead field TSs apply. In the example shown in FIG. 6, by providing the mapper 43 a version of the upstream bus 9' that is two clock cycles advanced w.r.t the multiplexer default input 30, the mapper 43 overhead field 51 processing logic gets two clock cycles of processing time 69 to prepare the appropriate data 31 and status 10 bit values for the bus overhead bit fields 51, and based on such processing, also for the successive payload field TSs 52+, for any given bus channel #.

Note further, regarding the adaptive multiplexing timing shown in FIGS. 5 and 6, and the system diagram of FIG. 4, that in embodiments illustrated in these figures the mapper 43 is able to prepare its outputs 31 and 10 for any given overhead field 51 TS, e.g. TS #4 within the field 51, by the time the multiplexer 1 operates on such byte TS, even before the mapper 43 has received all the overhead field 51 bytes on the advanced bus input 30'. For instance, in the case (per FIG. 6) where the advanced bus 30' is two clock cycles ahead of the multiplexer default input 30, the overhead field 51 TSs #0-8 (of #0,1, . . . 11) have already have been multiplexed out by the multiplexer 1 before the mapper has received the entire overhead field 51 on its input 30', and by the time that the multiplexer 1 is to operate on the considered example overhead field 51 TS#4, the mapper has received the overhead field TSs #0-6, but not yet the TSs #7-11, on the advanced default input 30'.

In an embodiment used in dynamic network bus channel allocation application (e.g. such as the applications per the reference [3]), the mapper knows, based on dynamic computations and/or static configurations, at any given clock cycle:
how many of the network channels (e.g. from channels #0-11) it is able to use during the next bus capacity allocation cycle, e.g. based on its existing amount of data queued for transmission on the given bus 9;

how many of the channels the mapper, in minimum, is authorized to use on the next capacity allocation channel whenever it is able to utilize such many channels; and that each mapper along the bus uses a consecutive range of the channels (for instance, channels #4-7, as in the case of the local mapper on the payload field 52+ following the overhead field 51 of FIG. 5).

Moreover, by monitoring the overhead field 51 (e.g. VC-3 POH on a VC-3-12c based bus 9 embodiment), the mapper detects which is the first (if any) of the channel TSs that it is, or should and will be, assigned for the next capacity allocation cycle on the bus.

With the above information, an embodiment of a mapper knows, once it has processed overhead field 51 received on its input 30' up to any given TS, e.g. TS #4, to which one of the mappers 43 along the bus 9 that TS-channel is assigned to (at that stage) for the next bus capacity allocation cycle; in such an embodiment, the processing of the later TSs, e.g. TSs #5-11, on the overhead field 51 will not change the assignments of the preceding TS-channels. Accordingly, the mapper thus, having processed any given overhead field 51 TS on the advanced bus input 30', knows whether and how to operate on the given TS-channel (i.e. mark the channel as assigned to itself, re-assigned to a downstream node along the bus, or left unmodified) by appropriately setting the related bits on that TS on the non-default input 31 and its associated status signals 10 provided to the multiplexer 1 (e.g., if deployed in channel access control signaling applications per the reference [3], particular its Appendix 1 Ch:s 3.4.1, 3.4.3 and 3.4.5, and specifically Table A-3-4-3, embodiments of mappers utilizing the herein disclosed techniques at the nodes along a bus are able to, in an implementationally highly efficient manner, (over)write the appropriate active source node identifier values on the Bus Access Maps bits [3:2] in the POH bytes 51). According to the herein studied embodiments of the invention, the mappers 43 thus do not need to receive and process all the overhead field 51 TSs before they are able to correctly prepare their local output bus entry 31 and status 10 bits for any given overhead field 51 TS # as they are being multiplexed out, as it is sufficient for a mapper to have processed the overhead field 51 TSs up to the current bus control TS being multiplexed by multiplexing system 1 to the bus 9. Such timed and architected embodiments are therefore able to significantly reduce the amount clock cycles that the advanced inputs 30' need to be phased ahead of the multiplexer upstream bus inputs 30, enabling significant reductions in the signal registering cost factors. Note that in the specific example shown in FIG. 6, the processing of the overhead field 51 TSs received on the input 30' by the mapper 43 logic, to produce the appropriate outputs 31 and 10, is assumed to take two clock cycles, per each given overhead field 51 TS #, and, accordingly, the bus input to the mapper 30' is advanced by two clock cycles w.r.t. the bus input 30 to the multiplexer 1. In that case, the mapper 43 logic has two clock cycles of processing time 69 to produce its outputs 31, 10 for any given multiplexing TS, including on the overhead field 51, based at least in part on the overhead information on the upstream bus input 30 (or a suitable substitute thereof) up to that given TS.

For applications of the invention per reference [3], with reference to FIG. 4 system, during the payload fields 52 on any given bus capacity allocation cycle, the mappers 43 control, by activating the status bits 10, their local node multiplexers 1 to select the bits from their local connections 6 (i.e. the multiplexing non-default inputs 31) to the multiplexing outputs 9 on those of the payload 52 TS-channels that were marked as assigned to the local source node of each given mapper in the recent bus overhead field 51 that applies for the given payload field 52. (For the purpose of this discussion, each mapper 43 along a bus 9 is considered to have its own source node.) Accordingly, in the embodiments of the invention discussed herein in particular detail, mappers 43 operate, timing-wise, under the control of bus overhead field 51 TSs, in the phase that each of these overhead TSs flows on the default upstream bus input 30 to multiplexer 1 (or via other suitable local substitute, e.g. in cases where there are no upstream nodes). As such, the dynamic bus TS-channel (re-) assignment control of the mappers 43 along a bus 9 operates in the same signal frame phase as the (original, upstream) bus 30 signal flows to the multiplexer. This allows a delay-free dynamic reaction by bus mappers 43 to control signaling on upstream bus 30 (or equal), and therefore, bus signaling based access control operation of the local bus mappers in a phase that is one clock cycle ahead of the multiplexer (clocked) downstream bus output.

Taken together, in various embodiments utilizing the herein disclosed techniques, the single bit TS accurate, input status adaptive multiplexing enables synchronized access to network channel overhead and data bit fields among multiple source nodes, where the network resource (channel) allocation and assignments algorithms can thus be in whole or in part distributed among a number of network nodes, e.g. in applications per reference [3], allowing virtually delay-free adapting and optimization of the network bandwidth allocation according to the realtime data packet traffic load variations among the group of network nodes in question, without having to use payload capacity for signaling overhead. Accordingly, the invention enables continuously maximizing network payload data throughput for variable bit rate traffic streams. Various other types of applications of the invented mechanisms naturally are possible as well.

CONCLUSIONS

This detailed description is a specification of embodiments of the invention for application examples and illustrative system operation scenarios discussed in the foregoing. Specific application, architectural and logic implementation examples are provided in this and the referenced patent applications for the purpose illustrating possible implementation examples of the invented concepts, as well as related utilization scenarios. Naturally, there are multiple alternative ways to implement or utilize, in whole or in part, the principles of the invention as set forth in the foregoing.

Generally, those skilled in the art will be able to develop different versions and various modifications of the described embodiments, which, although not necessarily each explicitly described herein individually, rely on the principles of the invention, and are thus included within its spirit and scope. It is thus intended that the specification and drawings be considered not in a restrictive sense, but as exemplary only, with a true scope of the invention being indicated by the following claims.

What is claimed is:

1. An individual bit granular, input status adaptive multiplexing system for connecting input data bits onto multiplexed channels, the system comprising:

a set of data inputs, at least one of which carries multiple input bits on any given timeslot (TS);

a data output, providing multiple bit positions for each TS, configured to carry a bit from one of the data inputs on each of its bit positions on any given TS;

a selector configured to identify, for any given TS, an input bit from one of the data inputs to be selected for each data output bit position;

multiplexing logic configured to connect, during any given TS, to each data output bit position the input bit that is identified by the selector for that output bit position on that TS; and, mapper logic producing at least one of the data inputs and forming the selector for a given TS based at least in part on overhead bit fields on one or more of the data inputs up to that TS.

2. The system of claim 1, wherein:
the selector comprises multiple bits, and
specific selector bits identify specific input bits to be connected to specific data output bit positions.

3. The system of claim 1, wherein the mapper logic forms the selector at least in part by processing overhead bit fields on such a data input among the set of data inputs that the mapper logic does not produce.

4. The system of claim 1, wherein the mapper logic forms the selector at least in part by processing overhead bit fields on a default data input among the set of data inputs.

5. The system of claim 1, wherein the mapper logic forms the selector at least in part by processing overhead bit fields on an advanced-timing version of a default data input among the set of data inputs.

6. The system of claim 1, wherein:
the selector comprises multiple bits,
each data input carries as many input bits per a TS as there are data output bit positions, and
specific selector bits correspond to specific input bits and data output bit positions, identifying the data input from which the input bit corresponding to any given selector bit is to be connected to the data output bit position corresponding to the given selector bit.

7. The system of claim 1, wherein:
the selector comprises as many bits as there are data output bit positions, said bits referred to as selector bits,
each data input carries as many bits per a TS as there are data output bit positions,
the set of data inputs comprises two alternative data inputs, from either one of which an input bit is to be selected for any given data output bit position on any given TS, and
each selector bit corresponds to one of the data input bits and to one of the data output bit positions, identifying from which alternative data input its corresponding input bit is to be connected to its corresponding data output bit position.

8. The system of claim 7, wherein the mapper logic forms the selector at least in part by processing overhead bit fields on an advanced-timing version of a default data input among the alternative data inputs.

9. The system of claim 1, wherein the input bit that is selected for a given one of the data output bit positions on a given TS is from a different data input than the input bit that is selected for another one of the output bit positions on that TS.

10. A cross-connect system comprising:
a set of multiplexing systems arranged to form the cross-connect system, wherein at least one of the multiplexing systems is the multiplexing system of claim 1; and
a set of cross-connect inputs and a set of cross-connect outputs, wherein at least one of the set of cross-connect outputs is multiplexed out of two or more of the set of cross-connect inputs by at least one of the set of multiplexing systems.

11. An individual bit granular, input status adaptive multiplexing method for selecting bits from data inputs onto a data output, the method comprising:

receiving a set of data inputs, at least one of which carries multiple input bits on any given multiplexing timeslot (TS);
for any given TS, forming a selector, by a logic module producing one of the data inputs based at least in part on overhead bit fields on one or more of the data inputs up to that TS, to identify an input bit from one of the data inputs to be selected for each one of a set of data output bit positions; and
during any given TS, connecting to each data output bit position the input bit that is identified by the selector for that output bit position on that TS.

12. The method of claim 11, wherein forming the selector for any given output bit position on any given new TS of any given multiplexed channel results in the selector identifying a different data input than on an immediately preceding TS of the given multiplexed channel for the given output bit position, in case so demanded based on a processing of the overhead bit fields on one or more of the data inputs up to that TS.

13. The method of claim 11, wherein the input bit that is connected to a given one of the data output bit positions on a given TS is from a different data input than the input bit that is selected for another one of the output bit positions on that TS.

14. The method of claim 11, wherein the overhead bit fields, based at least in part on which forming the selector is done, are received by the logic module producing one of the data inputs via an advanced-timing version of another one of the data inputs.

15. An individual bit granular, input status adaptive multiplexing system for connecting input data bits onto multiplexed channels, the system comprising:
a set of data inputs, at least one of which carries multiple input bits on any given timeslot (TS);
a data output, providing multiple bit positions for each TS, configured to carry a bit from one of the data inputs on each of its bit positions on any given TS;
a selector configured to identify, for any given TS, an input bit from one of the data inputs to be selected for each data output bit position, and;
multiplexing logic configured to connect, during any given TS, to each data output bit position the input bit that is identified by the selector for that output bit position on that TS,
wherein the selector is formed based at least in part on status of one or more of the data inputs during that TS, said status produced at least in part by processing overhead information on an advanced-timing version of at least one of the data inputs.

16. The system of claim 15, wherein the selector is formed for any given new TS on any given multiplexed channel so that it identifies for at least one of the output bit positions a different data input than on an immediately preceding TS of that channel in case the status of one or more of the data inputs is different on the new TS than on the preceding TS of that channel.

17. The system of claim 15, wherein
the set of data inputs comprises two alternative inputs, one of which is designated as a default input and the other as a non-default inputs, and
the selector is formed for any given new TS on any given multiplexed channel so that it identifies for at least one of the output bit positions a different data input than on an immediately preceding TS of that channel in case a status of the non-default data input is different on that new TS than on the preceding TS of that channel.

18. The system of claim 15, wherein the selector is formed directly based on the status of one of the data inputs.

19. The system of claim 15, wherein the status of one or more of the data input bits comprises an auxiliary input bit indicating whether its corresponding data input should be selected.

20. The system of claim 15, wherein
one of the alternative inputs is designated as a default input and the others as non-default inputs, and
the system is configured to select for connection to a given output bit position an input bit corresponding to the given output bit position from the default input whenever a status of none of the non-default alternative input bits corresponding to the given output bit position expresses that such a non-default input bit should be selected.

21. An individual bit granular, input status adaptive multiplexing process for selecting bits from data inputs onto a data output, the process comprising a set of sub-processes including:
receiving a set of input signals on a set of data inputs, at least one of which carries multiple input bits on any given multiplexing timeslot (TS);
for any given TS, forming a selector to identify an input bit from one of the data inputs to be selected for each one of a set of data output bit positions; and
during any given one of a series of repeating TSs, connecting to each data output bit position the input bit that is identified by the selector for that output bit position on that TS,
wherein forming the selector is done based at least in part on a status of one or more of the data inputs during the current TS, said status produced at least in part by processing overhead information on an advanced-timing version of at least one of the data inputs.

22. The process of claim 21, wherein on a given TS, input bits from different data inputs are identified for connection to different bit positions among the set of data output bit positions.

23. The system of claim 21, wherein forming the selector is done directly based on the status of one of the data inputs.

24. The system of claim 21, wherein forming the selector is done directly by using status bits of a local input among the set of data inputs.

25. The process of claim 21, wherein
the set of data inputs comprises a local input; and
forming the selector for any given new TS on any given multiplexed channel results in the selector identifying a different data input than on an immediately preceding TS of the given channel in case a status of the local input is different on that new TS than on the preceding TS of said channel.

* * * * *